Patented Feb. 8, 1949

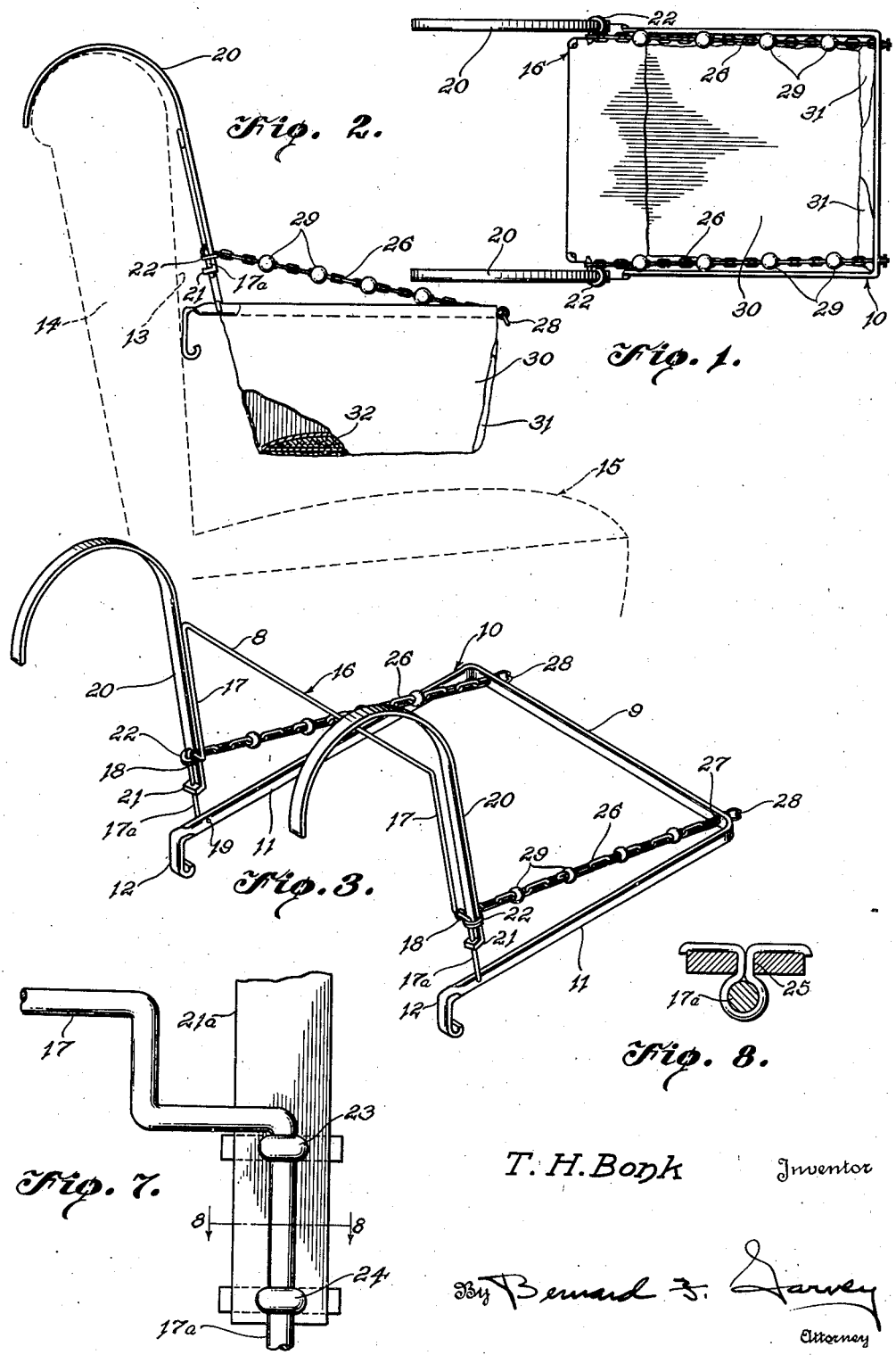

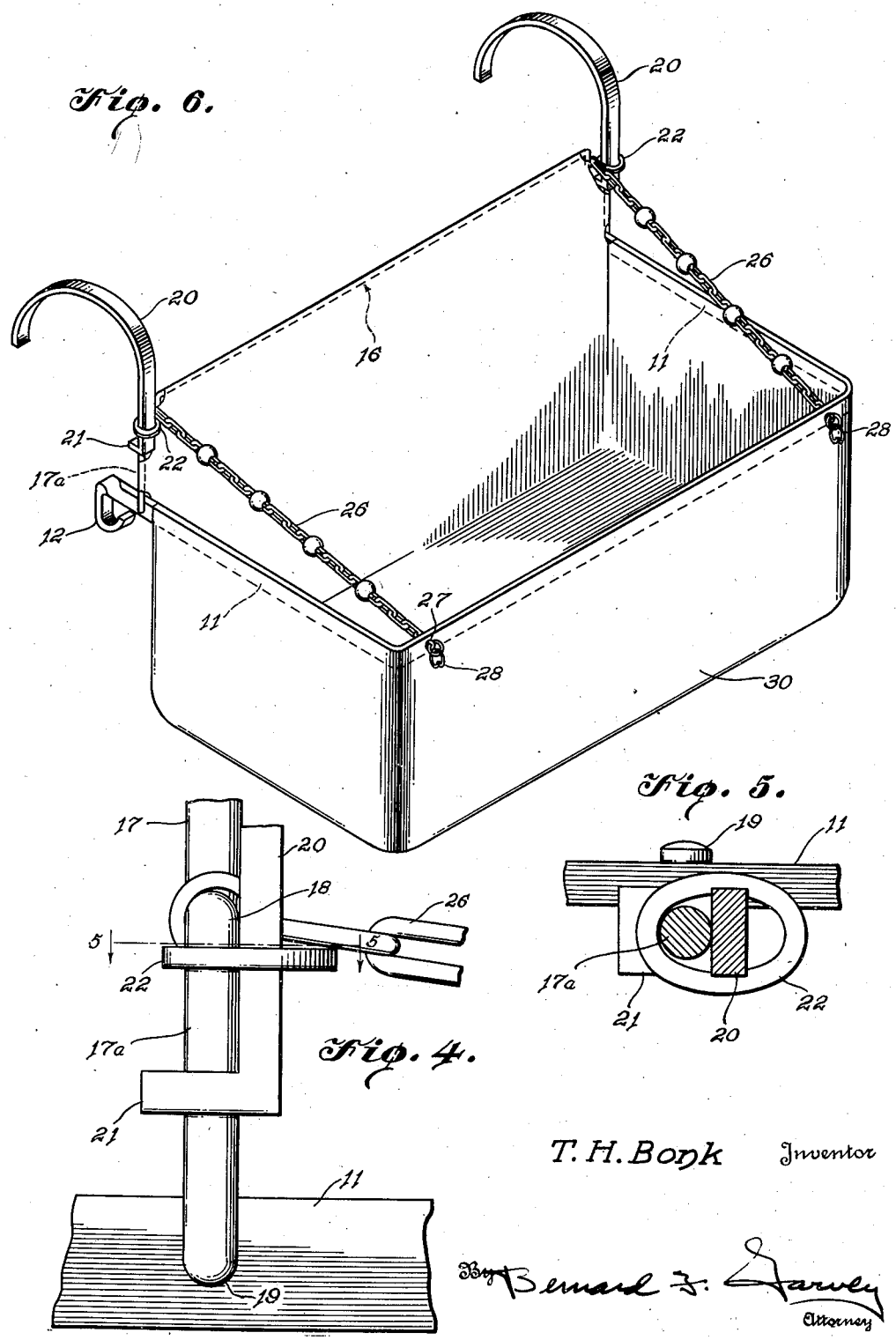

2,461,367

UNITED STATES PATENT OFFICE 2,461,367

COLLAPSIBLE OR FOLDING INFANT'S AUTO SEAT

Theodore H. Bonk, Tampa, Fla.

Application June 10, 1946, Serial No. 675,759

3 Claims. (Cl. 155—79)

This invention relates to a child's collapsible carrier of the type for carrying a child in a safe manner in a vehicle.

The carrier of my invention may be either in the nature of a child's seat or in the nature of a crib or cot for carrying an infant, the device in either form being adapted to be secured to and carried by the conventional passenger seat of a passenger vehicle.

Among the objects of this invention are to provide a frame, the structural characteristics of which will be substantially the same whether the device, in final form, is in the nature of a child's seat or an infant's crib or cot; to improve upon the connection between the frame structure per se and the supporting hooks therefor, to the end that such hooks may be readily moved to a position of use for securing the device in place on the automobile passenger seat or to a folded position of rest as when the device is collapsed for storage or carrying purposes; to provide for a device of the character mentioned, a frame structure so designed and the fulcrumed points of which are of such a character and so located that the desired maximum stiffness is attained with the exclusive frame work; to provide a device that is inexpensive and lends itself readily to quantity production, a wide range of adjustability and which will otherwise meet all of the requirements of a device of this general character.

The invention together with the stated and other objects as will present themselves hereinafter, will be best understood from the following detailed description read in reference to the accompanying drawings in which are illustrated what are presently considered preferred embodiments of the invention and wherein:

Figure 1 is a top plan view of a child's collapsible seat embodying the features of the present invention;

Figure 2 is a side view of the seat, with certain parts broken away and shown in section, and illustrating an application of the invention;

Figure 3 is a perspective view of the frame structure contemplated by the invention, said structure being shown in fully extended condition;

Figure 4 is an enlarged fragmentary detail elevational view for more fully illustrating a swivel connection forming a salient feature of the invention;

Figure 5 is a fragmentary horizontal sectional view taken substantially on the line 5—5 of Figure 4;

Figure 6 is a perspective view of a collapsible crib and illustrating a further application of the invention;

Figure 7 is a fragmentary perspective view illustrating a modified form of swivel connection; and Figure 8 is a fragmentary detail horizontal section taken substantially on the line 8—8 of Figure 7.

Whether the device of the invention be in the form of a child's seat as suggested in Figures 1 and 2, or in the nature of a crib as suggested in Figure 6, the same comprises essentially a frame structure such as illustrated in Figure 3.

Referring now in detail to Figure 3, it will be seen that the frame structure therein illustrated comprises what may be termed a horizontal frame 10 made of steel strip bent to form a substantially rectangular frame, open at one side. At the open side of the frame, the members 11—11 thereof are formed with angularly disposed terminals 12 adapted, when the device is in use, to abut or lie against the front surface 13 of the back rest 14 of the conventional seat 15 of a motor passenger vehicle.

The reference numeral 16 indicates generally a vertical or back frame made of galvanized iron wire. This frame 16 is substantially rectangular and the members 17—17 thereof have terminals 17A that are laterally displaced relative thereto and connected therewith by offsets 18. The offset terminals 17A merge into or have formed integrally therewith pintles 19 that are journaled in bearing openings in the members 11 of frame 10 adjacent the ends 12 of said members 11. Thus it will be seen that frames 10 and 16 are pivotally connected to fold relative to one another. As will be apparent from the foregoing, the device of this invention is adapted to be supported by the seat of the automobile, and to that end there are provided hooks 20—20 that are adapted to hook over the top of the back 14 of the automobile seat as shown to advantage in Figure 2. Hooks 20 are constructed from steel strip and the shanks thereof at their free terminals are formed with integral right angularly disposed apertured lugs 21 through which the offset ends 17A of frame 16 are trained. Each hook 20 is also provided at a point thereon adjacent to the lug 21 with an eye 22.

In the form of the invention illustrated in Figures 4 and 5, the eye 22 is substantially oval and embraces the shank of the hook 20 in the manner clearly shown in Figure 5. Eye 22 is fixed on the shank of the hook 20 in any suitable manner as by being welded thereto and has a part thereof disposed in substantial alignment with the apertured lug 21 in a manner to accommodate the offset end 17A of the proximate frame member 17. Thus it will be seen that the elements 17A, 21 and 22 effectively cooperate to provide an efficient swivel connection between a hook 20 and the proximate frame member 17 whereby said hook 20 is free to rotate about the frame terminal 17A as an axis. This just described swivel connection constitutes a salient feature of this invention and through the medium of the same, the hooks 20 may be readily rotated to a position facilitating the engagement thereof with the back rest of the automobile seat, and also may be as conveniently rotated from such position to fold against the back of the structure when the latter is in a fully collapsed condition for storage or similar purposes.

In Figures 7 and 8, an alternate form of swivel or hinge connection is illustrated. As shown in said figures, the mentioned connection is in the form of a pair of vertically spaced cotter pins 23, 24 carried by the hook therein indicated by the reference numeral 21A. The cotter pins 23, 24 are disposed adjacent the lower or free end of the shank of the hook, and to accommodate the cotter pins, said shank is provided with vertically spaced apertures or holes 25.

As shown in Figure 8, each cotter pin is secured to the shank of a hook 20 by having the legs thereof passed through a hole 25 from one side of the shank and then spread as shown. Preferably the legs of the cotter pin are such a length that the free terminals thereof, when the pin is spread in the manner just mentioned, may be bent into engagement with the edges of the hook shank thus preventing rotative movement of the cotter pin. In this manner, the eyes of the cotter pins are in constant alignment and retained against undesirable frictional contact with the offset end of the proximate frame member 17, and to which the hook is pivotally connected by having said offset end of the frame member trained through the eyes of the cotter pins 23, 24, and as shown in Figure 7.

To retain the horizontal frame 10 in horizontal position when the device is in use, and in the desired position as to height above the automobile seat proper, there are provided lengths of chains 26—26. Each chain 26 has one end link thereof sleeved on the offset 18 whereby said one end of the chain is connected with the back frame 16. The other end of the chain is trained through an opening 27 provided therefor in the member 9 of frame 10, and said end of the chain is equipped with a clasp 28 in the form of a resilient split ring or link (Figures 3 and 6) that is engageable with a selected intermediate link in the chain for securing the frame 10 at the desired angular adjustment with respect to the back frame 16, and consequently at the desired elevation with respect to the automobile seat.

To secure the frame 10 at the desired adjustment as and for the purpose stated in the preceding paragraph, the clasp-equipped ends of the chains are drawn through the openings 27 in the member 9 and then bent back upon themselves to permit the clasps to be readily engaged with selected intermediate links of the chains.

If desired, and as shown, each chain 26 may be equipped with ornaments 29 of any desired connection, and preferably which will be of an attractive character, having in mind the purpose for which the device is designed. To the frames 10 and 16 is secured a piece of canvas or other suitable cloth 30 cut to proper shape to form either the seat of the assembly, as where the device is to serve as a child's seat (see Figures 1 and 2), or to form an infant's cot or crib as where the device is to be used as such (see Figure 6).

The cloth 30, as shown, has certain of its edges secured to the members 9 and 11 of frame 10 and other of its edges secured to the members 8 and 17 of frame 16. The edges of the cloth may be secured to the mentioned frame members in any suitable manner such as by having said edges provided with seams through which the frame members are threaded, and as will be fully appreciated by those skilled in this art.

Where the device is to serve as a child's seat, the cloth 30 will be provided with suitable apertures to form openings 31 for the child's legs. Also when the device partakes of the nature of a seat, a removable seat pad 32 may be employed to obvious advantage.

From the preceding description, it will be seen that the only differences between the device when constructed for use as a child's seat, and when constructed for use as an infant's cot or crib, are in the dimensions of the several parts of the device and in the provision or omission of openings 31.

From the foregoing, it will be seen that the device of this invention lends itself to mass production either as a child's seat or an infant's cot or crib; may be readily applied to a vehicle seat in the manner indicated in the drawings; is capable of being easily collapsed or extended, and when not actually in use, may be readily folded neatly and compactly against the back rest of the automobile seat, and when extended for use provides support for the child or infant that is comfortable and capable of adjustment to accord maximum comfort and protection for the occupant of the device. Also by reason of the manner in which the suspension hooks of the device are connected to the frame, the hooks can be readily shifted relative to the frame into either a position for engagement over the back rest of the automobile seat, or into a folded position against the back of the collapsed device. Because of this latter feature, the entire structure when folded presents substantially a flat compact article which can be stored conveniently on either the floor or the seat of the automobile.

While I have described my invention in detail in its preferred embodiments, it will of course be understood that such has been done for purposes of illustration only and not for purposes of limitation, and therefore only such limitations are to be imposed thereon as may come within the scope of the appended claims.

What I claim is:

1. In a portable child's carrier of the type designed for use in connection with the passenger seat of an automobile, a back frame having vertical side members each of which is provided with a lateral offset portion, and a supporting hook provided with fixed eyes spaced apart longitudinally of the shank of the hook and through which the offset portion of the frame member is trained to provide a swivel connection between the hook and frame member.

2. A child's carrier comprising a cloth-supporting frame structure comprising back and horizontal frames pivoted together, the horizontal frame having opposed members provided with free terminals adjacent the pivoted connection between the frames, the back frame having opposed members provided with terminals laterally displaced with respect thereto and connected therewith by integral offsets above the pivoted connection between the frames, a supporting hook associated with each of the mentioned opposed members of the back frame, and each supporting hook having thereon a pair of aligned hinge eyes embracing the terminal of the proximate back frame member.

3. In a child's carrier for use in connection with the passenger seat of an automobile, hingedly connected back and horizontal and frame members, said back frame member having sides, each provided with a laterally extending offset merging into a terminal portion for the respective sides, supporting hooks swivelly connected with the terminal portions of said sides, and chains having links engaged with said offset portions of said sides and retained against displacement by the cooperative action of said sides and the swivel connections between the supporting hooks and terminals, said chains having free end portions trained through openings provided therefor in the horizontal frame member, and clasps on the terminals of said free end portions, said end portions of said chains being adapted to be drawn through the said openings and bent back for engaging said clasps with selected intermediate links in the chains to secure said horizontal frame member at selected positions of angular adjustment with respect to said back frame.

THEODORE H. BONK.

REFERENCES CITED

The following references are of record in the file of this patent:

UNITED STATES PATENTS

| Number | Name | Date |
|---|---|---|
| 920,747 | Hughes | May 4, 1907 |
| 1,351,746 | Eberle | Sept. 7, 1920 |
| 1,387,049 | Gunderson | Aug. 9, 1921 |

FOREIGN PATENTS

| Number | Country | Date |
|---|---|---|
| 203,205 | Great Britain | Sept. 6, 1923 |
| 489,128 | Great Britain | July 20, 1938 |